United States Patent [19]

Ugajin

[11] Patent Number: 5,983,360
[45] Date of Patent: Nov. 9, 1999

[54] INFORMATION PROCESSING SYSTEM WITH COMMUNICATION SYSTEM AND HOT STAND-BY CHANGE-OVER FUNCTION THEREFOR

[75] Inventor: Atsushi Ugajin, Sagamihara, Japan

[73] Assignee: Hitachi, Ltd., Tokyo, Japan

[21] Appl. No.: 08/881,120

[22] Filed: Jun. 24, 1997

[30] Foreign Application Priority Data

Jun. 27, 1996 [JP] Japan .................................. 8-167612

[51] Int. Cl.$^6$ .................................................. G06F 11/00
[52] U.S. Cl. .......................................................... 714/11
[58] Field of Search ............................ 395/182.09, 181, 395/200.51; 364/281.9, 285.3, 285.1, 285; 370/216; 714/2, 11; 709/221; 710/11, 30, 105

[56] References Cited

U.S. PATENT DOCUMENTS

| | | | |
|---|---|---|---|
| 5,473,771 | 12/1995 | Burd et al. | 395/182.09 |
| 5,513,314 | 4/1996 | Kandasamy et al. | 395/182.04 |
| 5,517,488 | 5/1996 | Miyazaki et al. | 370/16 |
| 5,533,191 | 7/1996 | Nakano | 395/182.09 |
| 5,544,077 | 8/1996 | Hershey | 364/570 |
| 5,649,091 | 7/1997 | Ould-Ali et al. | 395/182.09 |
| 5,727,142 | 3/1998 | Chen | 395/181 |

FOREIGN PATENT DOCUMENTS

| | | |
|---|---|---|
| 6-59924 | 3/1994 | Japan . |
| 6-110800 | 4/1994 | Japan . |

OTHER PUBLICATIONS

Hart, "Extending the IEEE 802.1 MAC Bridge Standard to Remotee Bridges" IEEE Network, vol. 2, No. 1, pp. 10–15, Jan. 1988.

Bartee, "Data Communications, Networks, and Systems", Second Edition, ISBN 0–672–22790–8, Chapter 9, "Local Area Network Standards", pp. 311–341, Dec. 1992.

Kessler et al., "A Primer On Internet and TCP/IP Tools", RFC 1739, Network Working Group, pp. 1–46, Dec. 1994.

*Primary Examiner*—Robert W. Beausoliel, Jr.
*Assistant Examiner*—Stephen C. Elmore
*Attorney, Agent, or Firm*—Fay, Sharpe, Beall, Fagan, Minnich & McKee

[57] ABSTRACT

A running information processing system and a standby information processing system are connected via networks to a bridge to communicate with partner terminals. A hot standby function is provided such that the partner terminal is not required to include a path change-over function. When it is assumed via an alive or dead state monitoring path that the running system is not operating normally, the standby system takes over processing of the running system, adds to a frame a communication address of the running system as the communication address of the transmission source, and sends the frame via the bridge. The bridge includes a plurality of ports to connect a plurality of LANs, and transfers between the ports the frame to which the communication addresses of the transmission source and destination of the information processing system are added for a relaying operation of the frame. The relaying operation is accomplished according to a latest correspondence relationship between the port having received the frame sent from the information processing system of the transmission source of the frame and the communication address of the information processing system of the transmission source added to the frame. When the standby system transmits via the bridge a frame including the communication address of the running system as the communication address of the transmission source, the bridge transmits the frame destined to the running system to the standby system without recognizing change-over of the running system.

9 Claims, 12 Drawing Sheets

BRIDGE-SIDE BLOCK DIAGRAM (FIG. 8)

FIG. 9
PRIOR ART

| PORT NO. | MAC ADDRESS | RECEPTION COUNTER |
|---|---|---|
| a | A | |
| b | B | |
| c | C | |
| d | D | |

FIG. 10

| PORT NO. | MAC ADDRESS | RECEPTION COUNTER |
|---|---|---|
| a | – | |
| b | A | |
| c | C | |
| d | D | |

FIG. 14
PRIOR ART

| ETHERNET START ADDRESS |
|---|
| ETHERNET END ADDRESS |
| FIELD TYPE |
| HARDWARE TYPE ETC. |
| FIELD TYPE |
| OPERATION (1:ENQUIRY, 2:RESPONSE) |
| TRANSMISSION SOURCE MAC ADDRESS |
| TRANSMISSION SOURCE IP ADDRESS |
| TARGET DESTINATION MAC ADDRESS |
| TARGET DESTINATION IP ADDRESS |

INFORMATION PROCESSING SYSTEM WITH COMMUNICATION SYSTEM AND HOT STAND-BY CHANGE-OVER FUNCTION THEREFOR

BACKGROUND OF THE INVENTION

1. Field of the Invention

The present invention relates to a client server system (CSS) in which a server information processing system is connected to client information processing systems via an inter-network such as a bridge, and in particular, to a hot standby technology between a running or current server information processing system and a standby server information processing system.

2. Description of the Related Art

In JP-A-6-110800, there has been described a conventional technology related to the method of conducting a change-over from a running host computer to a standby host computer. According to the conventional technology, when a failure of the running host computer is detected, the standby host (backup) computer receives or takes over the application processing being executed by the running host computer and broadcasts to the network a message indicating a change-over of the communication path. On receiving the message indicating a change-over of the communication path, each system communicating with the running host computer up to the point of occurrence of the failure disconnects the communication path to the running host computer in which the failure occurred and then establishes a communication path to the standby host computer to continuously accomplish the application processing.

Additionally, the JP-A-6-59924 describes another conventional technology. In accordance with this conventional technology, when a change-over is conducted to the standby host (backup) computer in response to occurrence of a failure in the running host computer, the standby host computer transmits a host change-over message to each terminal. When the host change-over message is received, the terminal recognizes that the change-over of the running host computer is carried out, disconnects the communication path to the running host computer in which the failure occurred, and establishes a communication path to the standby host computer to continuously accomplish the application processing.

SUMMARY OF THE INVENTION

These two conventional technologies above are attended with problems as follows. (1) When a failure occurs in the running host computer, an event of a change-over of the host computer from the running system to the standby system due to the occurrence of failure is notified through a predetermined message to a system or a terminal communicating with the running host computer. On receiving the message, the system or terminal as the communication partner recognizes the change-over of the running host computer. That is, the system or terminal as the communication partner is required to recognize the change-over of the running host computer. (2) Moreover, after recognizing the change-over of the running host computer, the system or terminal as the communication partner is required to change the communication path from the running host computer to the standby host computer. Therefore, any system as well as any terminal which becomes the communication partner of the host computer is required to include a communication path change-over function.

It is therefore an object of the present invention to provide a communication network system in which a running server information processing system, a standby server information processing system, and client information processing systems are connected via a network to each other and in which a change-over from the running server information processing system to the standby server information processing system can be conducted without making the client information processors perceive a change-over of the communication path and to a server information processing system having a hot standby change-over function.

To solve the problem above, in a communication system including a running server information processing system, a standby server information processing system, and a bridge including a plurality of ports to which a network to be connected to the running server information processing system and a network to be connected to the standby server information processing system are respectively connected. Transfer means for transferring and relaying between the ports information to which a communication address of a transmission source of the information processing system and a communication address of a receiving destination of the information processing system is added. The relaying operation is achieved in accordance with a latest correspondence relationship between a port having received the information transmitted from the information processing system and the communication address of the transmission source of the information processing system added to the information. The standby information processing system includes monitor means for monitoring whether or not the running information processing system is appropriately operating and standby processing means for receiving, when it is assumed by the monitor means that the running information processing system is not appropriately operating, processing of the running information processing system, adding the communication address of the running information processing system as the communication address of the transmission source, and transmitting the information via the bridge.

In this manner, when it is assumed that the running information processing system is not appropriately operating, for example, when a failure occurs in the running information processing system, the standby information processing system adds to information the communication address (e.g., an MAC address of TCP/IP) of the running information processing system as the communication address of the transmission source and then sends the information from transmission means. In the bridge, the transfer is conducted in accordance with the latest correspondence relationship between the communication address of the transmission source of the information processing system and the port having received the information. On receiving by the bridge the information (frame) from the standby information processing system in which the communication address of the running information processing system is set as that of the transmission source, the bridge transfers the information on assumption that the port corresponding to the communication address is a port to which the standby information processing system is connected. Using this function of the bridge, the communication path between the running information processing system and the communication terminal can be changed over to that between the standby information processing system and the communication terminal. On the side of the communication partner, nothing is required to be perceived and hence the change-over function is not necessary.

BRIEF DESCRIPTION OF THE DRAWINGS

FIG. 9 is an explanatory diagram showing a relation table between port numbers of the bridge and MAC addresses when the running server information processing system is appropriately operating.

FIG. 10 is an explanatory diagram showing the relation table between port numbers of the bridge and MAC addresses after a change-over in which a failure occurs in the running server information processing system and is replaced with the standby server information processing system.

FIG. 14 is a frame layout diagram of ARP.

DESCRIPTION OF THE PREFERRED EMBODIMENTS

Figure 1:
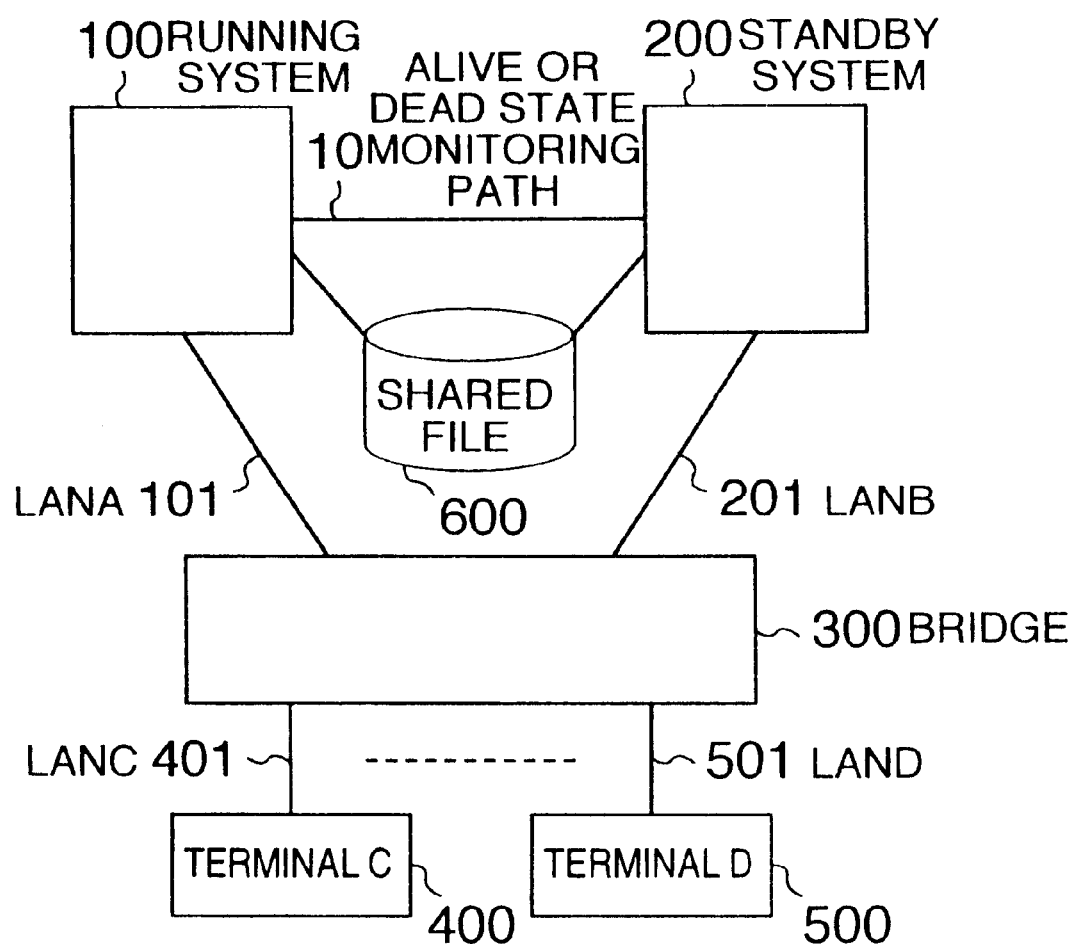
FIG. 1 is a system configuration diagram of a favorable embodiment of the present invention.

Referring to the drawings, description will be given of an embodiment of the present invention.

FIG. 1 shows the configuration diagram of a communication system in a best embodiment of the present invention. In FIG. 1, a running server information processing system 100 is a server information processing system to conduct processing requested by a client information processing system. A standby server information processing system 200 is a server information processing system in a standby system to conduct in place of the running server information processing system 100, when the running server information processing system 100 cannot appropriately achieve operation due to a failure or the like, processing requested by a client information processing system. Incidentally, in the following description, the running and standby server information processing systems will be referred to as a running system and a standby system, respectively. Similarly, the client information processing system will be referred to as a terminal.

The running system 100 and the standby system 200 are connected to each other via an alive or dead state monitoring path 10 for monitoring in the standby system 200 the alive or dead state, namely, whether or not the running system 100 is normally operating. Furthermore, a shared file 600 which is a shared memory to be accessed by the running system 100 and the standby system 200 is connected to each of the running and standby systems 100 and 200. In addition, the running system 100 and the standby system 200 are respectively connected to local area networks LAN A 101 and LAN B 201. Connected further to each LAN is a bridge 300.

The standby system 200 is a hot standby backup apparatus which monitors via the alive or dead state monitoring path 10 the operating state of the running system such that when the running system 100 is not normally operating, the standby system 200 can take over an application of the running system 100. For example, when a failure occurs in the running system 100, the standby system 200 determines that the running system 100 is not normally operating due to the failure and takes over the processing of the running system 100. In this operation, the standby system 200 adds to a frame (an MAC frame) the communication address of the running system 100 as the communication address of the transmission source and sends the frame to the bridge 300.

The bridge 300 includes a plurality of ports to connect to a plurality of LANs and transfer means to relay frames. The transfer means transfers between the ports the frame to which the communication addresses respectively of the transmission source information processing system and the transmission destination information processing system to thereby relay the frame. In the operation, the transfer means relays the frame in accordance with the latest correspondence relationship between the port having received the frame sent from the information processing system as the frame transmission source and the communication address of the transmission source information processing system added to the frame. The bridge 300 may be an apparatus which includes a function of a router and/or a gateway to connect an LAN to another LAN. The bridge 300 is further connected to an LAN C 401 and an LAN D 501.

The LAN C 401 and LAN D 501 are respectively connected to a terminal C 400 and a terminal D 500. The terminals C 400 and D 500 and the running system 100 conduct communication according to TCP/IP, and the terminals C 400 and D 500 operate as client information processing systems and the running system operates as a server system.

Figure 2:
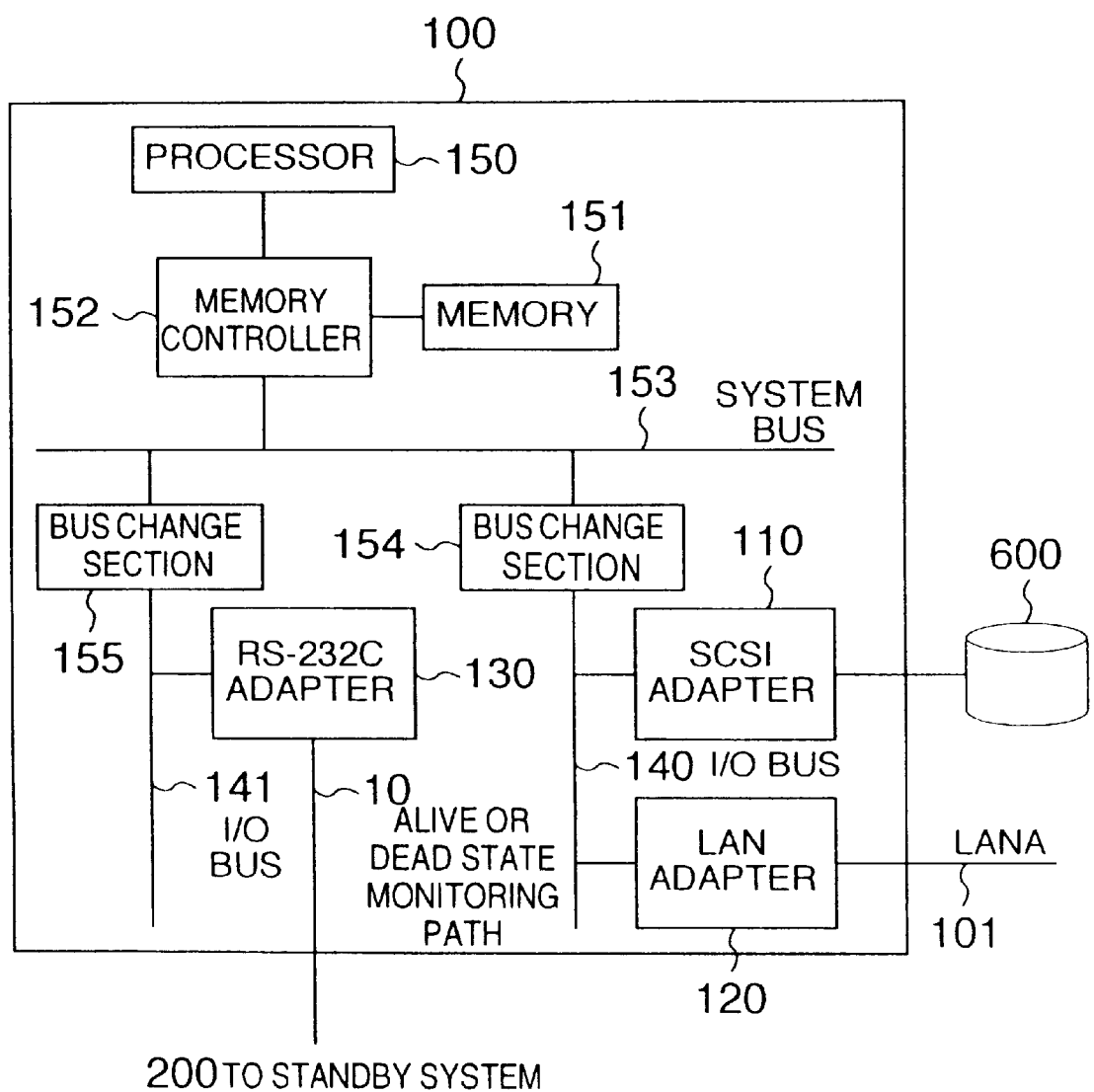
FIG. 2 is a block diagram showing the internal structure of a server information processing system.

Next, description will be given of the block configuration of the running system 100. FIG. 2 shows a block diagram of the internal structure of the running system 100 shown in FIG. 1. The configuration of the standby system 200 is the same as that of the running system 100.

In FIG. 2, the running system 100 includes a processor 150, a memory 151, a memory controller 152 to control accesses to the memory 151, and bus change sections 154 and 155 to conduct bus changes, and each of the memory controller 152 and the bus change section 154 and 155 is connected to a system bus 153. I/O buses 140 and 141 are connected to the bus change sections 154 and 155 such that various I/O devices are connected to these buses via adapters respectively thereof. For example, the I/O bus 140 is connected via an SCSI adapter 110 to the shared file 600 and to the LAN A 101 via an LAN adapter 120. Moreover, the I/O bus 141 is connected via an RS-232C adapter 130 and a communication line to an RS-232C adapter of the standby system 200. A communication line connected via the RS-232C 130 functions as the alive or dead state monitoring path 10.

Figure 3:
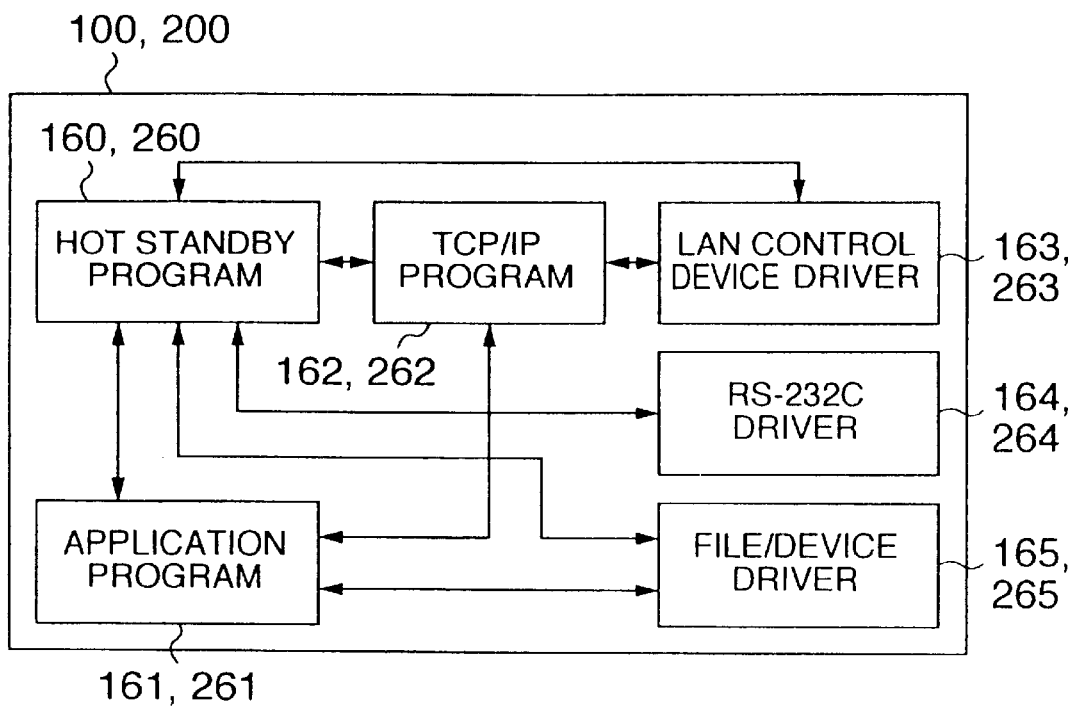
FIG. 3 is a block diagram showing the program layout in the server information processing system.

FIG. 3 shows the configuration and relationship of programs of software in the running and standby systems 100 and 200. When the running system 100 does not conduct a normal operation due to a failure or the like, the standby system 200 is used as a new running system. After failure recovery processing is executed so that the system 100 operates normally, the system 100 is set as a new standby system. Therefore, each of the running and standby systems 100 and 200 has the same program configuration.

In FIG. 3, a hot standby program 160 is a program to monitor an alive or dead state of the partner device and to achieve a change-over at occurrence of a failure. An application program 161 is a program to conduct application processing in response to a request from a terminal. The application program 161 has a function operative at occurrence of a failure in the running system when the pertinent system is operating as a standby system to read data from the shared file 600 so as to take over the application processing. A TCP/IP program 162 carries out TCP/IP communication processing. Additionally, this program implements a command operative at occurrence of a failure in the running system when the pertinent system is operating as a standby system to add to a frame the communication address of the running system 100 as the communication address of the transmission source so as to send the frame to the bridge 300. For example, an address resolution protocol (ARP) command can be used as the command above. The ARP command is a UNIX command. When a media access control (MAC) address of the receiving destination is unknown, the ARP command is used to issue an enquiry for the address through a broadcasting operation. In this embodiment, the ARP command is employed to notify the correspondence relationship between the MAC address of the transmission source and the port to the bridge. At occurrence of a failure in the running system 100, the standby system 200 adds to the frame of the ARP command the communication address of the running system 100 as the communication address of the transmission source and then broadcasts the frame. An LAN control device driver 163 controls the LAN adapter 120. An RS-232C driver 164 controls the RS-232C adapter 130. A file device driver 165 controls the shared file 600.

In FIG. 3, arrows connecting respective programs (including drivers) to each other indicate that each thereof has an interface with the partner. The hot standby program 160, the application program 161, and TCP/IP program 162 can be operated by the processor 150 of the running system and the processor of the standby system. These programs are acquired from the programs stored on such recording media as an FD and a CD-ROM to be installed in the running and standby systems 100 and 200. The respective programs may be stored on a recording media or may be stored in separate recording media. Alternatively, the programs may be installed through a down-load operation from another information processing system connected to the network.

Figure 4:
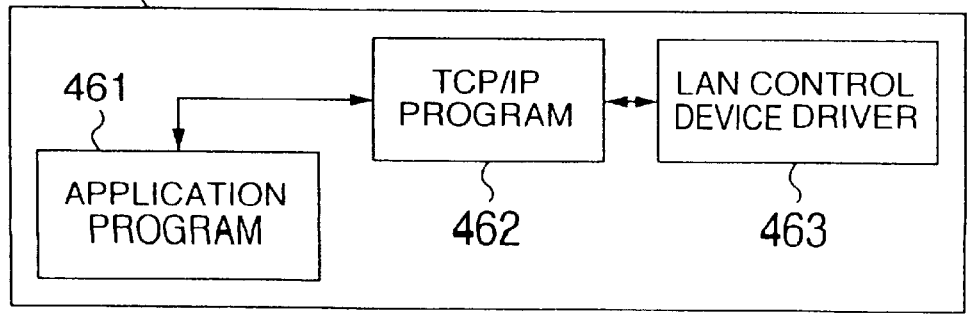
FIG. 4 is a block diagram showing the program layout in a client information processing system.

Next, FIG. 4 shows the layout of and a relationship between programs in the terminals C 400 and D 500 on the client side achieving communication with the running system as a server. The application program 461 is a program which communicates with the running system 100 or the standby system 200 to carry out application processing. Additionally, this program realizes the issuance of and response to the ARP command. The LAN control device driver 463 controls the LAN adapter.

Figure 5:
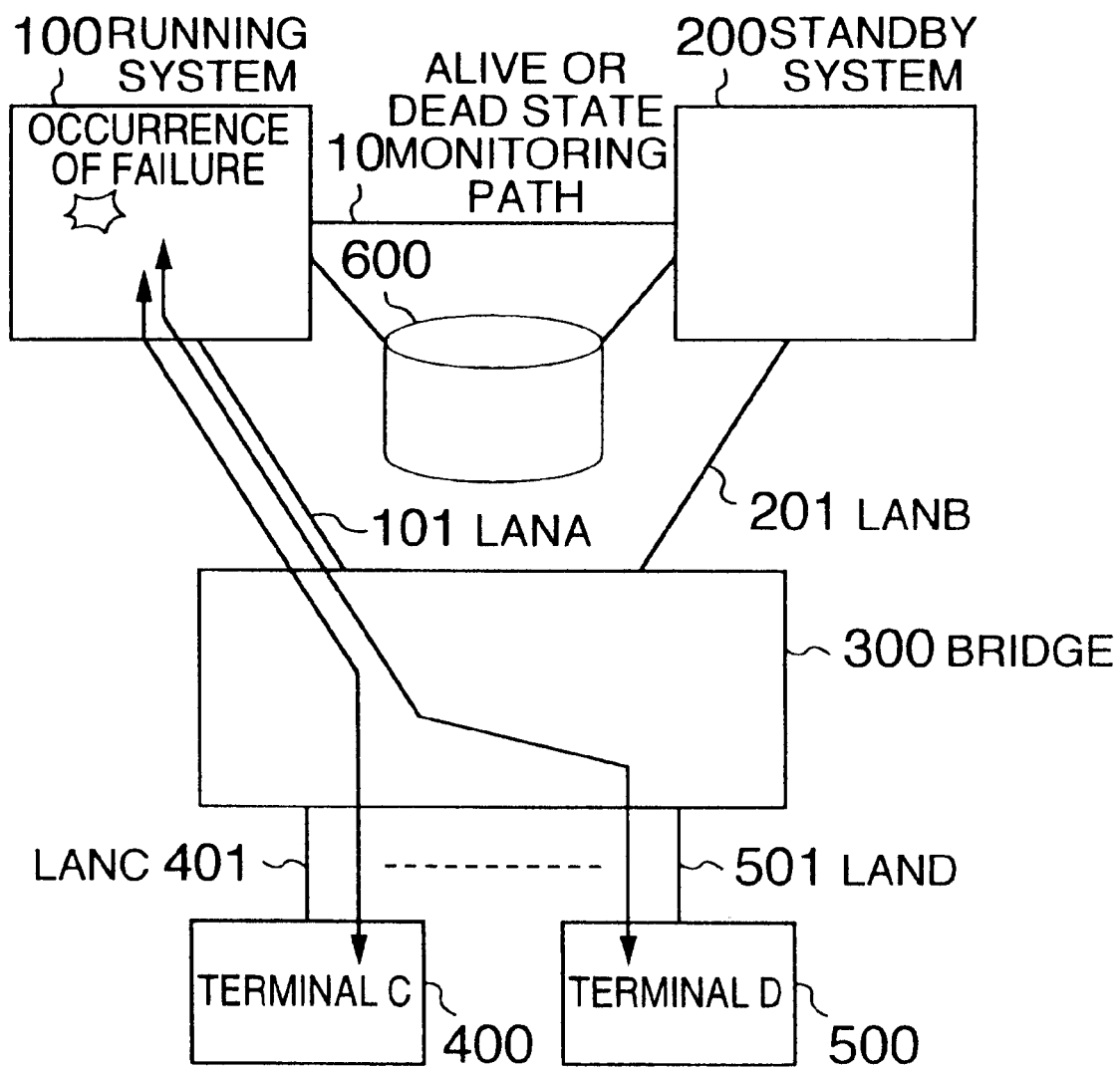
FIG. 5 is a diagram showing communication when a running server information processing system is appropriately operating.
Figure 6:
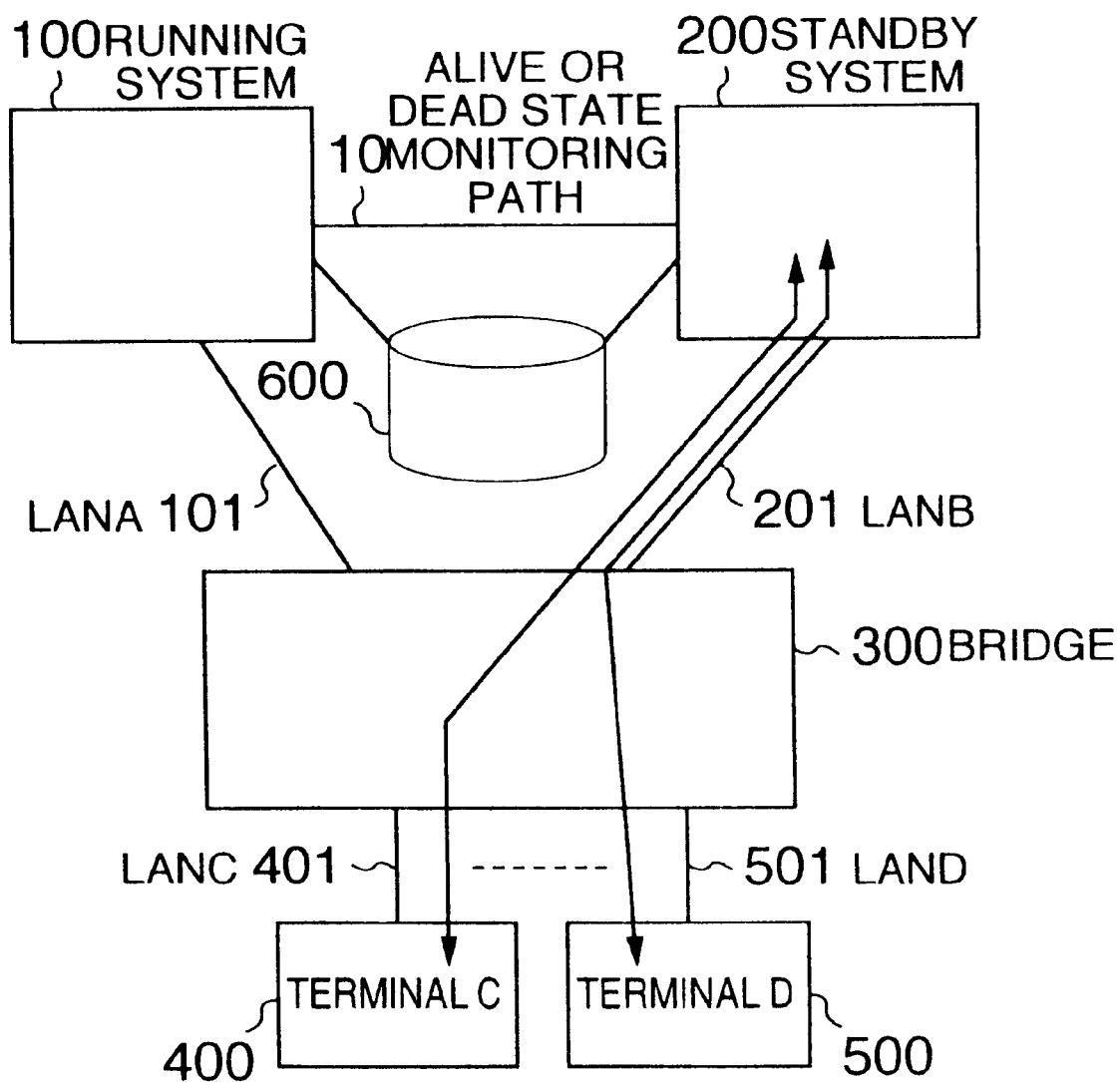
FIG. 6 is a diagram showing communication after a change-over in which a failure occurs in the running server information processing system and is replaced with a standby server information processor.

Referring subsequently to FIGS. 5 and 6, description will be given of the embodiment of the present invention, namely, operation in a case in which the running system is appropriately operating and operation in a case in which a failure occurs in the running system and a change-over takes place from the running system 100 to the standby system 200.

FIG. 5 is a diagram showing the case in which the running system is appropriately operating. In FIG. 5, the terminal C 400 is connected via the LAN C 401 to the bridge 300 to be further connected via the LAN A 101 to the running system 100. Similarly, the terminal D 500 is connected via the LAN D 501 to the bridge 300 to be further connected via the LAN A 101 to the running system 100. TCP/IP is employed as the communication protocol. FIG. 6 shows a state after a change-over, namely, a failure occurs in the running system 100 and hence the system 100 is replaced with the standby system 200. In FIG. 6, the terminal C 400 is connected via the LAN C 401 to the bridge 300 to be further connected via the LAN B 201 to the standby system 100. Similarly, the terminal D 500 is connected via the LAN D 501 to the bridge 300 to be further connected via the LAN B 201 to the standby system 100. The terminals C 400 and D 500 can continuously accomplish the application processing without necessity of perceiving the occurrence of the failure in the running system; moreover, these terminals need not include any path change-over means, which will be described later.

Figure 7:
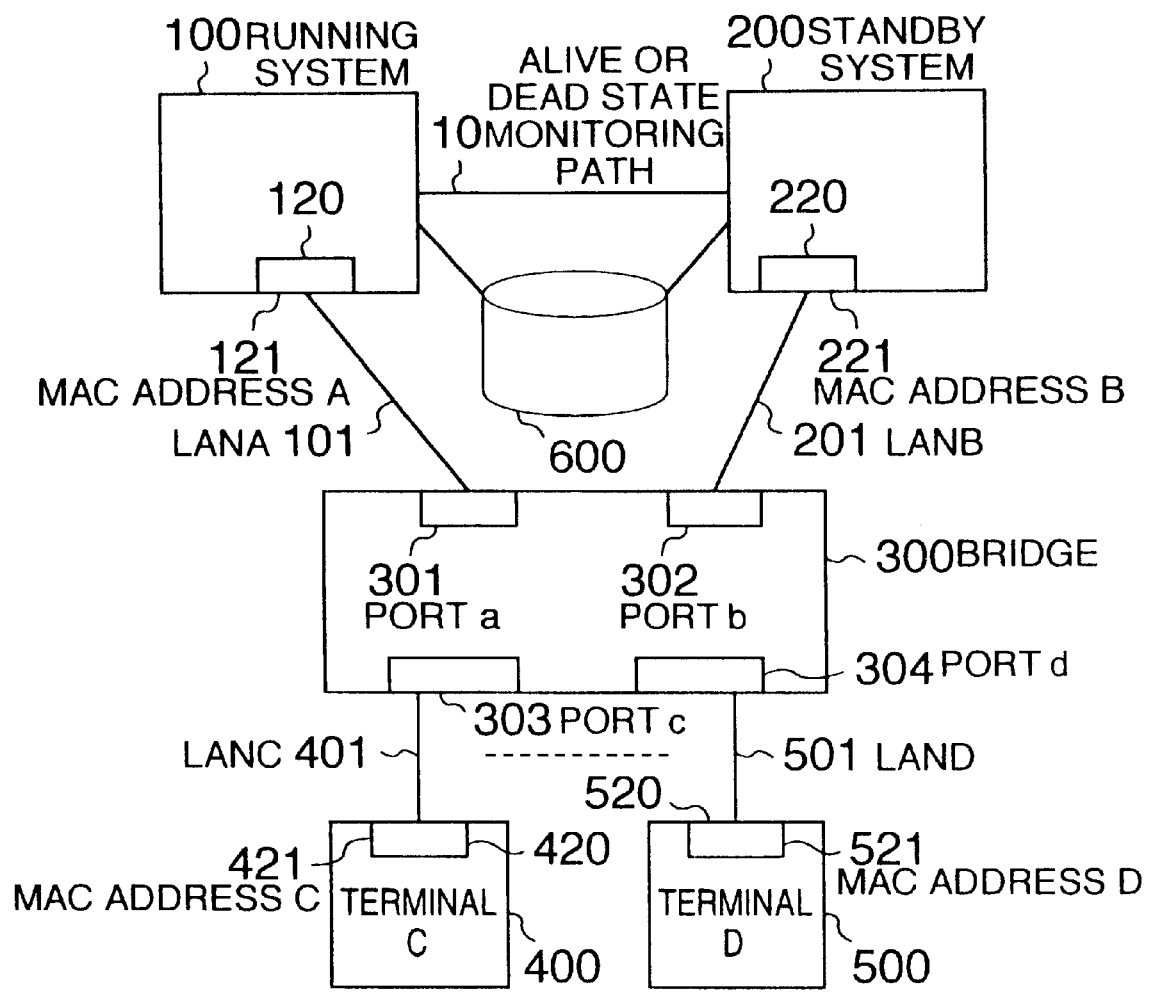
FIG. 7 is a system configuration diagram showing a relationship between MAC addresses and ports of a bridge.

Referring now to FIGS. 7 to 10, the configuration of the bridge 300 will be described. FIG. 7 is a system configuration diagram showing a relationship between MAC addresses and ports of the bridge. When conducting communication with TCP/IP, an MAC address and an IP address are used as a communication address to specify information processing systems respectively of the transmission source and destination. When relaying a frame, the bridge 300 utilized in the system configuration carries out a filtering operation according to the MAC address. The information processing system according to the present invention includes a hot standby function, including a plurality of ports and a filtering database. The function learns, by use of a transmission source MAC address in a reception frame, a correspondence between each of the ports and a MAC address of an information processing system connected to the port and is connected via a first network to a first port selected from a plurality of ports of a bridge registered to the filtering database.

Figure 8:
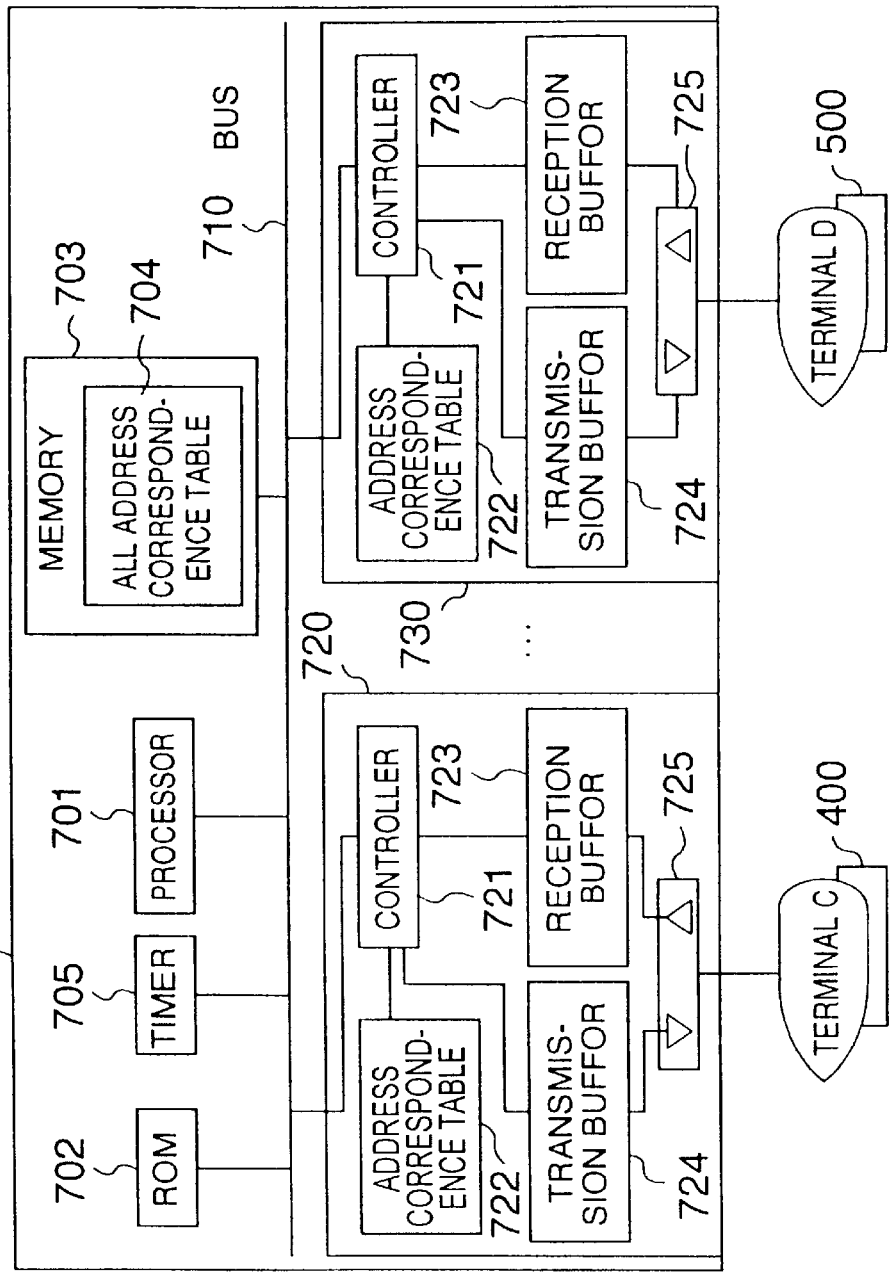
FIG. 8 is a block diagram of the bridge.

FIG. 8 shows a block configuration of the bridge 300. FIG. 9 shows the contents of an address correspondence table keeping therein a correspondence between port numbers of the bridge 300 and MAC addresses when the running system 100 is appropriately operating. FIG. 10 shows the contents of an address correspondence table keeping therein a correspondence between port numbers of the bridge 300 and MAC addresses after the running system 100 is replaced with the standby system 200 in response to detection of a failure in the running system 100. The address correspondence tables shown in FIGS. 9 and 10 are loaded in the bridge. Incidentally, the layout of the address correspondence tables indicates the idea of the bridge and these tables are not necessarily required to be configured in the same table layout.

In FIG. 7, the LAN adapter 120 of the running system 100 has an MAC address A12. Similarly, the LAN adapter 220 of the standby system 200 has an MAC address B221, the LAN adapter 420 of the terminal C 400 has an MAC address C421, and the LAN adapter 520 of the terminal D 500 has an MAC address D521. The bridge 300 has a port a 301, a port b 302, a port c 303, and a port d 304 which are respectively connected local area networks LAN A 101, B 201, C 401, and D 501.

In FIG. 8 the bridge 300 includes a processor 701, an ROM 702, a memory 703, a timer 705, ports 720 and 730 and these ports are connected to a bus 710. Stored in the memory 703 is an all address correspondence table 704. The timer 705 monitors time for the standby system 200 to determine whether or not the running system 100 is appropriately operating. The ports 720 and 730 are connected to a terminal C 400 and a terminal D 500 respectively via the local area networks LAN C 401 and LAN D 501. Each of the ports 720 and 730 includes a controller 721, an address correspondence table 722, a reception buffer 723, a transmission buffer 724, and a transmission/reception driver 725. The controller 721 controls operation of the port. Stored in the address correspondence table 722 is an MAC address corresponding to the pertinent port, which will be described later. The reception buffer 723 is a buffer in which a reception frame is temporarily accumulated. Similarly, the transmission buffer 724 is a buffer in which a transmission frame is temporarily accumulated. The transmission/reception driver 725 is connected to the LAN to achieve communication of frames with the LAN.

The address correspondence table 722 is configured as shown in FIGS. 9 and 10. On the other hand, the all address correspondence table 704 is of a configuration obtained by removing a reception counter from the address correspondence table 722 shown in FIGS. 9 and 10. Stored in each of the tables 704 and 722 are correspondence items each including a port number and a transmission source MAC address of a frame received via the port. Included further in the address correspondence table 722 is a reception counter to count the number of frames which are received via the port and which have as the transmission source address the MAC address correspondent to the port. The bridge 300 deletes an entry of the MAC address from the address correspondence table when any frame having the MAC address as the transmission address is not received for a predetermined period of time. For this purpose, the processor 701 of the bridge 300 checks the value of the reception counter at a predetermined interval of time. When the value is kept unchanged, the processor 701 assumes that the frame is not received for a predetermined period of time and then deletes (flushes) the associated MAC address. On the other hand, when the value of the reception counter is increased, the processor 701 assumes that the bridge received a frame during the predetermined period of time and then clears the reception counter to 0.

In FIG. 8, the controller of each port receives a frame via the transmission/reception driver 725 and the reception buffer 723 to detects the transmission source MAC address and the transmission destination MAC address which are added to the received frame. For each port, the controller 721 examines the entry corresponding to the pertinent port in the address correspondence table 722 such that when the entry includes the transmission source MAC address of the received frame, the controller 721 increments the associated reception counter by one. When the entry includes another transmission source MAC address, the controller 721 set to the entry the transmission source MAC address of the received frame, clears the associated reception counter to 0, and increments the counter by one. Additionally, when a new MAC address is set to an entry, the controller 721 of each port notifies to the processor 701 the new MAC address and own port number. On receiving the notification of the new entry, the processor 701 updates an MAC address in the all address correspondence table 704 corresponding to the notified port number and then notifies to the controllers 721 of all ports the port number thus set to the entry and the associated MAC address. On receiving the notification of the new entry, the controller 721 of each port updates an MAC address in the address correspondence table 722 corresponding to the notified port number.

Furthermore, the controller 721 of each port refers to the address correspondence table 722 for the ports and transfers the received frame via the bus 710 to a port corresponding to the transmission destination MAC address of the frame. On the port side to which the frame is transferred, the frame is sent via the transmission buffer 724 and the transmission/reception driver 725 to the information processing system of the transmission destination. Additionally, the controller 721 of each port refers to the address correspondence table 722 for the ports such that when the port corresponding to the transmission destination MAC address of the received frame is missing in the entries, the controller 721 interrupts the processor 701 together with the received frame. On receiving the interruption, the processor 701 transfer the received frame to all ports to thereby broadcast the frame. When the broadcast frame is received, the information processing system of the transmission destination returns a response frame thereto. On receiving the response frame, the bridge 300 sets the correspondence relationship between the MAC address and the port to the entry because the transmission source MAC address of the response frame is identical to that of the broadcast frame.

The processor 701 periodically updates the all address correspondence table 704 and the address correspondence table 722 of each port at a predetermined interval of time, for example, five minutes. That is, the processor 701 periodically refers to the address correspondence table 722 of each port. For an entry for which the value of the reception counter is not increased since the previous periodic update, the processor 701 deletes the transmission source MAC address in the associated entry of the all address correspondence table 704 and then instructs the controller 721 to delete the transmission source MAC address of the entry. Moreover, the processor 701 instructs the controller 721 of each port to clear to 0 the reception counter of each entry of the address correspondence table of the pertinent port. In this connection, if the value of the reception counter for each MAC address of the address correspondence table 722 of each port has been increased, the processor 701 clears the reception counter to 0 without changing the entry.

For example, assume in the configuration shown in FIGS. 7 and 8 that the running system 100 is appropriately running, items are stored in the address correspondence table 722 of each port as shown in FIG. 9, and the value of the reception counter is cleared to 0.

When the running system 100 is appropriately running, the contents of the table in the bridge 300 are as shown in FIG. 9, i.e., the port a 301 is connected to the information processing system having MAC address A, the port b 302 is connected to the information processing system having MAC address B, the port c 303 is connected to the information processing system having MAC address C, the port d 304 is connected to the information processing system having MAC address D (reference is to be made to FIG. 7). The bridge 300 does not include means to recognize a failure occurring in the running system 100. Consequently, when any frame is not received via the port for a fixed period of time, the bridge 300 flushes (deletes) the MAC address of the running system 100 corresponding to the port in the table.

In the example above, when the frame from the running system 100 of the transmission source to the terminal C 400 of the transmission destination is received, the controller 721 of the port a of the bridge 300 detects the transmission source MAC address and the transmission destination MAC address in the frame to confirm that the MAC address is equal to the transmission source MAC address corresponding to the port a of the address correspondence table 722, and increments the corresponding reception counter by one. Since the port c corresponds to the transmission destination MAC address C of the received frame, the controller 721 of the port a of the bridge 300 transfers the frame via the bus 710 to the port c. On the side of port c, the controller 721 temporarily stores the transferred frame in the transmission buffer 724 and then the transmission/reception driver 725 sends the frame to the terminal C 400 of the transmission destination.

Description will next be given of a case in which a failure occurs in the running system 100 and then the system 100 is replaced with the standby system as shown in FIG. 6. When a failure occurs in the running system 100, there continues a state in which no frame is transmitted from the running system 100 to the terminals C 400 and D 500. In this case, since the value of the reception counter of the MAC address A is not increased for a predetermined period of time in the address correspondence table 722 of the port a 301, the processor 701 of the bridge 300 deletes the MAC address a in the entry of the all address correspondence table 704 corresponding to the port a and instructs the controller 721 of each port to delete the MAC address A in the entry of the address correspondence table 722 corresponding to the port a.

On the other hand, the standby system 200 detects the failure of the running system 100 and then continuously executes the application processing which is executed by the running system up to this point of time. A communication sequence between the standby system 200 and the terminal C 400 in this case will be described later. When the standby system 200 receives the application for the continuous processing thereof, the hot standby program 260 of the standby system 200 transmits to the terminal C 400 a frame as an ARP command with "transmission source MAC address A". When the frame is received, the controller 721 of the port a of the bridge 300 detects the transmission source MAC address A and the transmission destination MAC address C in the frame to compare an MAC address corresponding to the port number b of the address corresponding table 722 with the transmission source MAC address A. When the controller 721 of the port b receives the ARP command frame before the correspondence relationship between the MAC address and the port in the bridge 300, the MAC address in the entry corresponding to the port number b of the address correspondence table 722 does not match the transmission source MAC address A of the ARP command frame. In this case, as can be seen from FIG. 10, the controller 721 of the port b registers the transmission source MAC address A to the entry corresponding to the port b, sets one to the reception counter of the pertinent entry, and notifies the MAC address A of the new entry and the port number b of the own port to the processor 701. On receiving the notification of the new entry, the processor 701 updates the MAC address of the entry corresponding to the port number b of the all address correspondence table 704 to A and then notifies the port number b and the associated MAC address A to the controller 721 of each port. Furthermore, since the port number a of the entry corresponding to the transmission source MAC address A of the address correspondence table 722 of the port b does not match the port number b of the ARP command frame, the controller 721 of the port b deletes the transmission source MAC address A of the entry corresponding to the port number a. Similarly, each of the processor 701 and the controllers of the respectively ports having received the notification of the port number b and the associated MAC address A deletes the transmission source MAC address A of the entry corresponding to the port number a in the address correspondence table thereof.

Additionally, the port b transfers the frame via the bus 710 to the port c corresponding to the transmission destination MAC address C of the received frame. On the side of port c to which the frame is transferred, the controller 721 temporarily accumulates the received frame in the transmission buffer 724 and then the transmission/reception driver 725 sends the frame from the transmission buffer 724 to the terminal C 400 of the transmission destination. Subsequently, when the port c receives a frame to which "MAC address A" is added as the transmission destination, the port b is stored in the entry corresponding to the MAC address a in the address correspondence table of the port c. Consequently, the controller 721 transfers the received frame directly to the port b.

As described above, the bridge 300 transfers the received frame in accordance with the correspondence relationship between the transmission source MAC address of the frame and the reception port.

Figure 11:
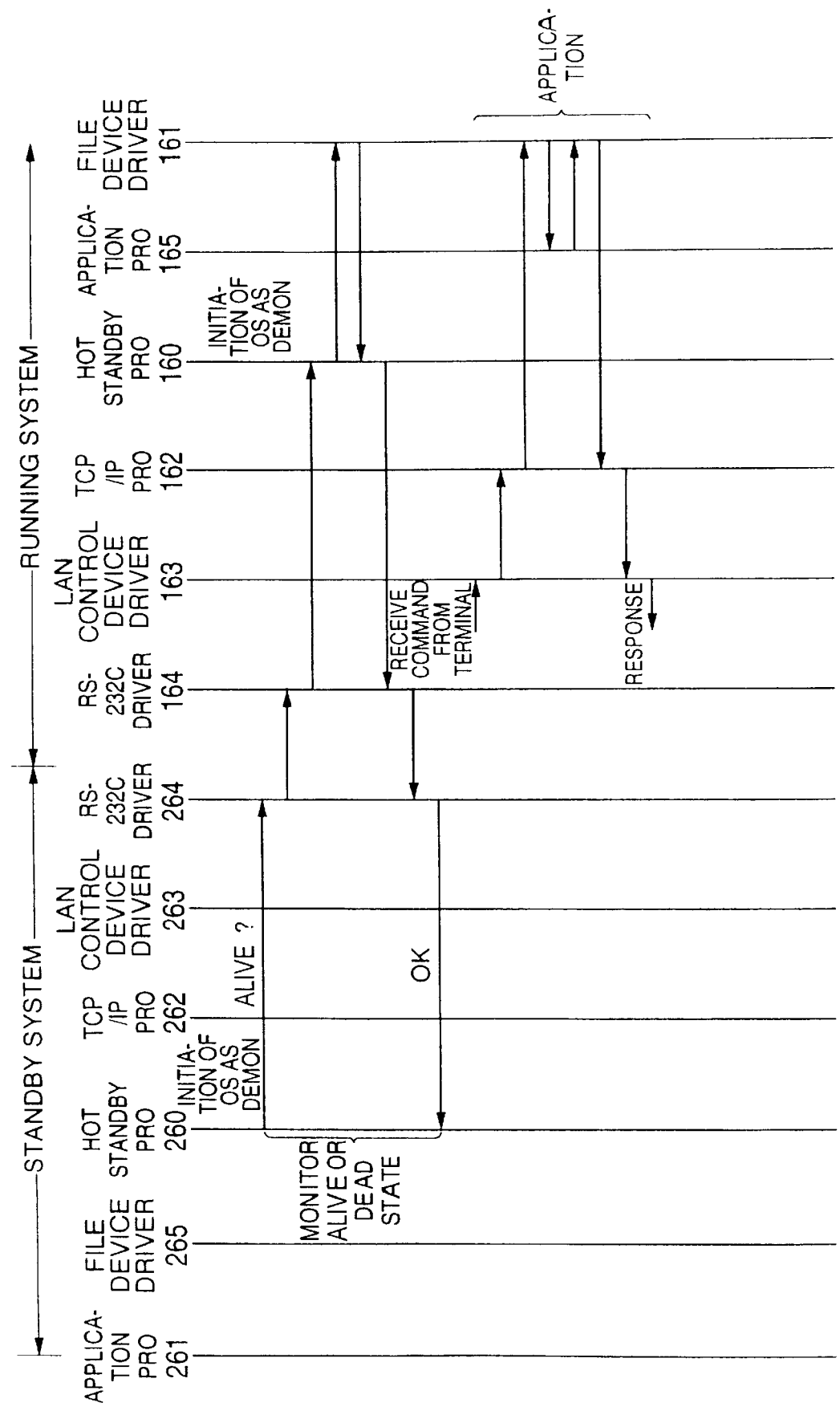
FIG. 11 is an explanatory diagram showing a sequence of operation of monitoring alive or dead state for the running server information processing system and a communication sequence between the client and server information processing system.
Figure 12:
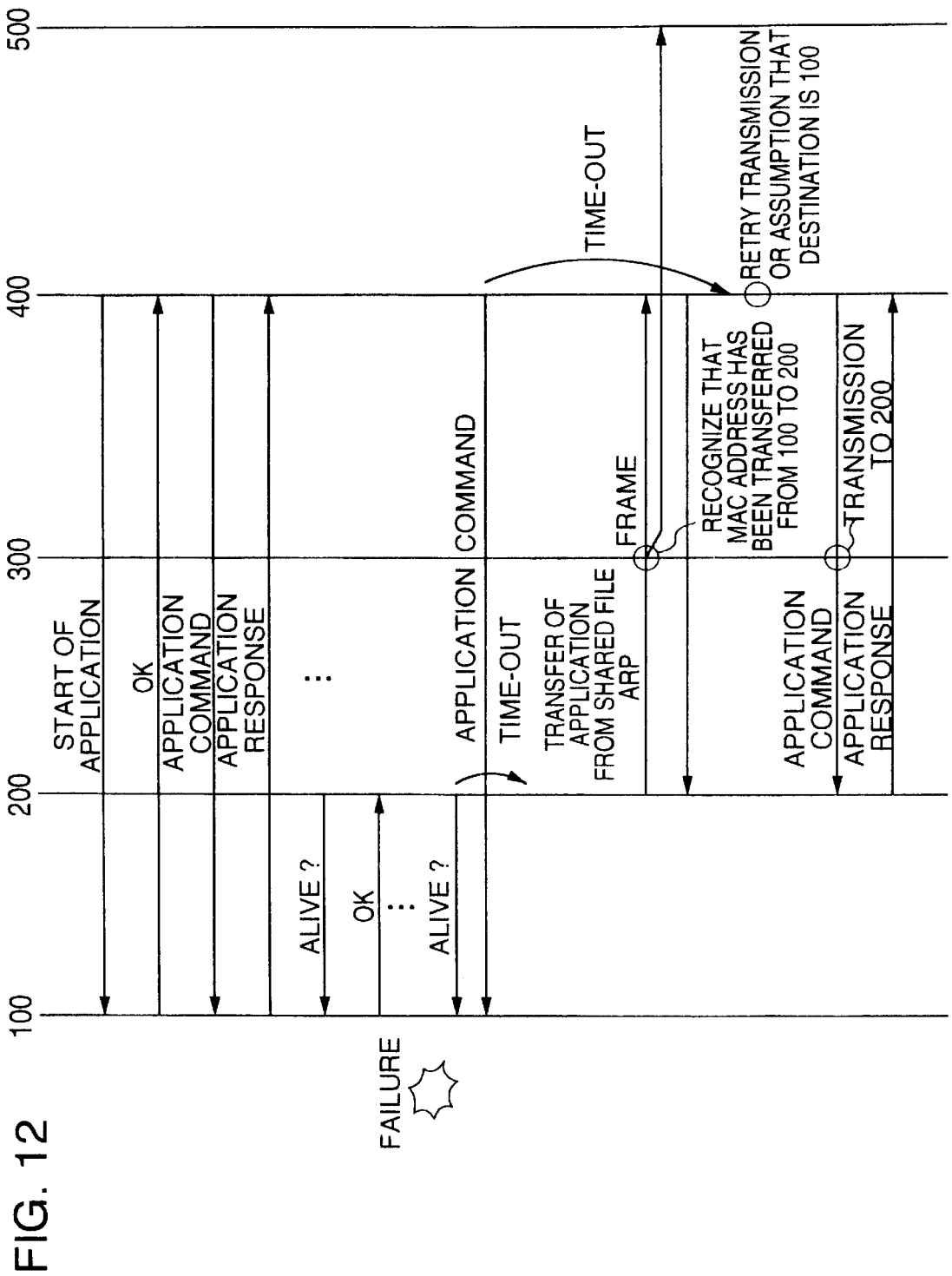
FIG. 12 is a sequence explanatory diagram showing a change-over operation in which a failure occurs in the running server information processing system and is replaced with the standby server information processing system.
Figure 13:
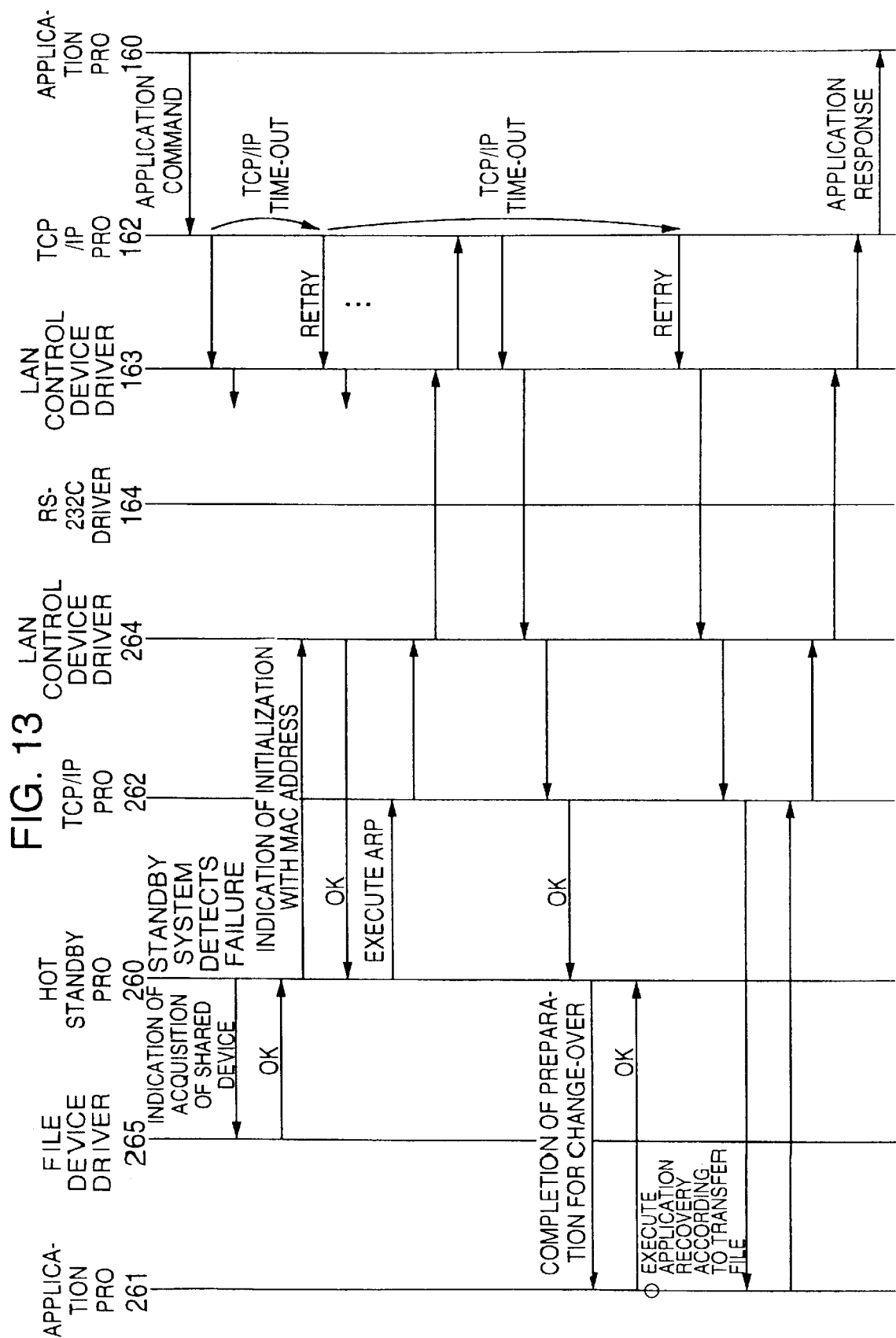
FIG. 13 is a sequence diagram between the standby server information processing system and the client information processing system up to when the normal communication can be restarted after the change-over to the standby server information processing system.

Referring next to FIGS. 11 to 13, description will be given of the operation sequences of the respective systems when the running system 100 is appropriately operating and when a failure occurs in the running system 100 and the system 100 is replaced with the standby system.

FIG. 11 shows a communication sequence for the standby system to monitor the alive or dead state and a communication sequence for the running system to communicate with a terminal. FIG. 11 shows communication between the software of the running system 100 and the software of the standby system 200 shown in FIG. 3.

In FIG. 11, according to the system setting specification of the standby system, when an operating system (OS) is initiated, the operating system automatically invoke the hot standby program 260. The program 260 issues an alive or dead state monitoring frame at an interval of time of one second. The frame is sent via the RS-232C driver 264 of the standby system 200 from the RS-232C adapter 130 shown in FIG. 2 to be transmitted via the RS-232C adapter 130 and the RS-232C driver 164 of the running system 100 to the hot standby program 160 of the running system 100. The program 160 communicates with the application program 161. If the operation is normally conducted, the program 160 returns OK to the hot standby program 260 of the standby system 200 via a route shown in FIG. 11. In the method of monitoring the alive or dead state, when no answer is received in response to a predetermined number (e.g., ten) of continuous retries of communication at the one-second interval or when NG is returned in response to the alive or dead state monitoring frame, the standby system 200 recognizes that a failure occurs in the running system 100. Assume that the period of time from the occurrence of the failure to the detection thereof is sufficiently shorter than the interval of time for the bridge to delete the entry from the correspondence relationship between MAC addresses and ports. In this situation, if the standby system 200 sends an ARP command frame with "transmission source MAC address A" to the bridge, a new entry can be registered to the correspondence relationship between MAC addresses and ports before the period of time for the bridge 300 to delete the entry from the address correspondence table. If the pertinent entry has been deleted from the address correspondence table, it will be only necessary to register a new entry to the correspondence relationship between MAC addresses and ports.

An application processed by the application program 161 of the running system 100 is carried out in response to an application command inputted from the terminal C 400 or D 500 shown in FIG. 5. That is, an application command inputted from the terminal is received by the LAN adapter 120 to be sent via the LAN control device driver 163 to the application program 161. Incidentally, to cope with occurrence of a failure, the program 161 outputs the contents of application processing to the shared file 600 by the file device driver 165.

Referring next to FIGS. 12 and 13, description will be given of operation in which a failure occurs in the running system 100, the system 100 is replaced with the standby system 200, and communication is normally enabled between the standby system 200 and the terminal. FIG. 12 shows a communication sequence between the running system 100, standby system 200, bridge 300, and terminals C 400 and D 500. FIG. 13 shows a sequence between the standby system 200 and the terminal in an operation in which a failure occurs in the running system 100, the system 100 is replaced with the standby system 200, and communication is normally enabled between the standby system 200 and the terminal.

In FIG. 12, the terminal C 400 transmits an indication of the start of application processing and then the application program 161 of the running system 100 returns OK thereto. The terminal C 400 then issues an application command and the running system 100 returns an application response. This operation is thereafter repeatedly accomplished. On the other hand, the hot standby program 260 of the standby system 200 is monitoring in the procedure shown in FIG. 11 whether or not the running system is normally operating. In FIG. 13, when a failure occurs in the running system 100, there continues a state in which the response "OK" is not received from the running system 100 in response to the alive or dead monitoring frame from the program 260 of the standby system 200, and hence an event of time-out takes place. The standby system 200 accordingly detects the failure of the running system 100. In consequence, the program 260 issues an indication to the file device driver 265 to read the shared file 600 and an indication to the LAN control device driver 263 to initialize the LAN adapter 220 with "MAC address A" which is the communication address of the running system 100. When the initialization is completed, the driver 263 returns OK to the program 260. In this state, it is possible to operate the LAN adapter 220 shown in FIG. 2. Additionally, the program 260 executes "ARP command" which is a TCP/IP command of UNIX.

FIG. 14 shows the frame layout of the ARP command. As shown in FIG. 14, the ARP command frame is configured such that IP address A is set as the transmission IP address, MAC address A is set as the transmission source MAC address, and IP address C is set as the transmission destination IP address and then the frame is transmitted in the broadcast mode without specifying any address for the transmission destination MAC address. The ARP command frame is sent to all terminals and then a response is issued from the TCP/IP program 462 of the terminal C 400 corresponding to the transmission destination IP address C. When the response frame is returned, the standby system 200 can confirm that the path is appropriately connected between the standby system 200 and the terminal C 400. On receiving the confirmed notification, the program 260 sends to the application program 261 a notification of completion of change-over preparation. When the notification is received, the program 261 reads necessary data from the shared file 600 to take over the application and then restarts the application.

Furthermore, there may be used a PING command (which is a UNIX command to transmit a data return frame) in place of the ARP command. In this case, the PING command frame is transmitted with the transmission destination set to terminal C 400 or D 500". When the PING command frame is transmitted, the bridge can also recognize that the MAC address A is changed to port b. Also for the PING command frame, a response is returned from the terminal C 400, and hence the standby system 200 can restart, when the response is received, the processing taken over from the system 100. As above, the frame transmitted from the standby system 200 need only be a frame for which the bridge can change the correspondence relationship between ports and communication addresses, namely, any frame which can be transmitted with the communication address of the running system set as the communication address of the transmission source.

In accordance with the embodiment, when the standby system 200 transmits an ARP command frame, the bridge 300 can recognize that the MAC address A is changed to port b to replace the communication path between the running system 100 and the communication partner terminal C 400 with that between the standby system 200 and the partner terminal C 400. On the other hand, the application program 461 of the terminal C 400 retries the transmission to the running system 100. The standby system 200 is initiated while the terminal C 400 is conducting the retry several times and thereafter the terminal C sends the ARP command frame thereto. On receiving the ARP command frame the bridge 300 recognizes that the MAC address A is changed to port b and then transmits a response frame of the ARP command to the standby system 200. Therefore, the side of the terminal C 400 of the communication partner can continuously accomplish the application without any necessity of recognizing the occurrence of failure in the running system 100. Additionally, utilizing a filtering database (the address correspondence table in the description) and a leaning function (a function in which according to a frame received by each port, a correspondence relation between a port and an MAC address of an apparatus connected via a network to the port is registered to the address correspondence table) which are provided as standard functions in the bridge 300, the bridge 300 can continuously accomplish the application without any necessity of recognizing the occurrence of failure in the running system 100. Moreover, the bridge 300 need not include any path change-over means. In addition, receiving a response frame from the terminal C 400, the standby system 200 can recognize that the frame correctly arrived at the terminal C 400 and the bridge 300 to thereby take over the application.

Although a communication line between RS-232C adapters is adopted as the alive or dead state monitoring path 10 in the description above, there may be employed another line or the LAN A 101 and LAN B 201 may also be used to communicate frames. However, in consideration of performance and reliability, it is desirable to utilize a communication line other than the LAN as in the embodiment.

In the description above, it is assumed that a failure occurs in the running system 100. However, the description also applies to a case in which a failure occurs in the LAN A 101 connecting the port a 301 of the bridge 300 to the running system 100.

Furthermore, when the running system is reinitiated as a standby system after a failure occurring in the running system 100 or the LAN A 101 is recovered, it is possible to conduct operation in a configuration including a running system and a standby system in which the states respectively of the running and standby systems are interchanged with each other.

Incidentally, in the operation to replace the running system 100 with the standby system 100, to prevent a secondary failure due to the running system 100 in which a failure occurred, it is to be appreciated that operations such as accesses from the running system 100 to the shared file 600 are inhibited.

In the embodiment above, to continuously conduct application processing also when a failure occurs in any network, the running and standby system are connected to mutually different networks. When the running and standby system are connected to one network, the re-write operation of the embodiment to re-write the address correspondence table of the bridge by the ARP or PING command is unnecessary. In the embodiment above, the running and standby system are connected to mutually different networks and hence the network to which the new running system (the standby system 200 in the embodiment) is connected after the change-over of the running system is notified to the bridge by the ARP or PING command.

In the embodiment above, description has been given of a case in which a bridge is used as the inter-network apparatus for connections of networks. However, the present invention is naturally applicable to an inter-network apparatus having a function to learn, according to a frame or packet received from an information processing system connected to a network, the network to which the information processing system is connected.

I claim:

1. A communication system, comprising an information processing system of a running system for processing information, an information processing system of a standby system for processing information, a communication path between the running information processing system and the standby information processing system, a plurality of networks respectively connected to the running information processing system and the standby information processing system, and an inter-network apparatus including a plurality of ports to be connected to the plural networks for relaying a message to which a communication address of a transmission source and a communication address of a transmission destination are added by transferring the message between the ports, and conducting the relaying operation in accordance with a latest correspondence relationship between a port having received information and the communication address of the transmission source added to the message, wherein the standby information processing system includes monitor means for monitoring whether or not the running information processing system is normally operating and standby processing means for taking over, when the monitor means determines that the running information processing system is not operating normally, processing of the running information processing system, adding the communication address of the running information processing system as the communication address of the transmission source to the message, and transmitting the message via the inter-network apparatus.

2. A communication system according to claim 1, wherein the inter-network apparatus is a bridge and the message is a MAC frame.

3. A hot standby change-over method for use in a communication system including an information processing system of a running system for processing information, an information processing system of a standby system for processing information, a communication path between the running information processing system and the standby information processing system, a plurality of networks respectively connected to the running information processing system and the standby information processing system, and an inter-network apparatus including a plurality of ports to be connected to the plural networks for transferring between the ports a message to which a communication address of a transmission source and a communication address of a transmission destination are added and thereby relaying the message, and conducting the relaying operation in accordance with a latest correspondence relationship between the port having received the information and the communication address of the transmission source added to the message, wherein the standby information processing system monitors whether or not the running information processing system is operating normally and taking over, when the running information processing system is not operating normally, processing of the running information processing system, adds the communication address of the running information processing system as the communication address of the transmission source to the message, and transmits the message via the inter-network apparatus.

4. A hot standby change-over method according to claim 3, wherein the inter-network apparatus is a bridge and the message is a MAC frame.

5. A hot standby change-over method according to claim 4, wherein the MAC frame transmitted via the bridge is an ARP command frame or a PING command frame.

6. An information processing system including a hot standby function and operating as a standby information processing system in a communication system including an information processing system of a running system for processing information, an information processing system of a standby system for processing information, a communication path between the running information processing system and the standby information processing system, a plurality of networks respectively connected to the running information processing system and the standby information processing system, and an inter-network apparatus including a plurality of ports to be connected to the plural networks for transferring between the ports a message to which a communication address of a transmission source and a communication address of a transmission destination are added and thereby relaying the message, and conducting the relaying operation in accordance with a latest correspondence relationship between a port having received the information and the communication address of the transmission source added to the message, wherein the information processing system including a hot standby function includes monitor means for monitoring whether or not the running information processing system is normally operating and standby processing means for taking over, when the monitor means determines that the running information processing system is not operating normally, processing of the running information processing system, adding to the message the communication address of the running information processing system as the communication address of the transmission source, and transmitting the message via the inter-network apparatus.

7. An information processing system including the hot standby function according to claim 6, wherein the inter-network apparatus is a bridge and the message is a MAC frame.

8. An Information processing system including a hot standby function, comprising a plurality of ports and a filtering data base, the function learning, by use of a transmission source MAC address in a reception frame, a correspondence between each of the ports and a MAC address of an information processing system connected to the port and being connected via a first network to a first port selected from a plurality of ports of a bridge registered to the filtering data base, the information processing system including monitor means for monitoring whether or not the running information processing system connected via a second network to a second port selected from the plural ports of the bridge is normally operating via a communication path between the running information processing system and the monitor means and standby processing means for taking over, when the monitor means determines that the running information processing system is not operating normally, processing of the running information processing system, adding the MAC address of the running information processing system as a transmission source address to a MAC frame, and transmitting the MAC frame via the bridge.

9. An information processing system according to claim 8, wherein when a terminal conducting communication with the running information processing system receives the MAC frame before the processing of the running information processing system is taken over, the standby processing means transmits a predetermined MAC frame such that the terminal returns a response thereto and takes over the processing of the running information processing system when the response to the MAC frame is returned from the terminal.

* * * * *